US005790635A

United States Patent [19]
Dezonno

[11] Patent Number: 5,790,635
[45] Date of Patent: Aug. 4, 1998

[54] SYSTEM AND METHOD FOR AUTOMATIC MONITORING OF ACTIVE TELEPHONE CALLS IN A TELEPHONIC SWITCH

[75] Inventor: Anthony J. Dezonno, Downers Grove, Ill.

[73] Assignee: Rockwell International Corporation, Costa Mesa, Calif.

[21] Appl. No.: 533,484

[22] Filed: Sep. 25, 1995

[51] Int. Cl.⁶ .............................. H04M 1/24; H04M 3/08; H04M 3/22
[52] U.S. Cl. .......................... 379/34; 379/265; 379/267; 379/309
[58] Field of Search .................. 379/1, 9, 34, 112, 379/113, 165, 265, 266, 267, 309, 10, 15

[56] References Cited

PUBLICATIONS

AT&T Network Systems: "5ESS Switching ACD/MIS", Telemarketing Services Application Guide, Switching Systems, Aug. 1990.

Primary Examiner—Curtis Kuntz
Assistant Examiner—Binh K. Tieu
Attorney, Agent, or Firm—Welsh & Katz, Ltd.

[57] ABSTRACT

A monitoring system and method for substantially automatically monitoring active incoming telephone calls being routed through a telephone switch, such as an automatic call distributor (ACD). The monitoring system includes a timing circuit which measures the length of time of each of the active incoming telephone calls routed through the ACD. The length of time of the active calls are sent to an organizing circuit which organized the calls in order of decreasing duration. Each of the active calls are then monitored by decreasing duration at a supervisor telephone. Concomitantly, a display video circuit sends a unique identification code to a supervisor terminal uniquely identifying the agent who is handling the currently monitored call. The calls to be monitored are further defined by selecting a call exceed duration value. Until the length of a call exceeds or equals the call exceed duration value, the call is not monitored.

16 Claims, 4 Drawing Sheets

FIG. 3

| CALL ID | AGENT ID | TIME |
|---------|----------|---------|
| 1120 | 4361 | 0:25:37 |
| 1160 | 4135 | 0:20:15 |
| 1060 | 4736 | 0:15:06 |
| 2140 | 2214 | 0:10:12 |

START

↓

400 — SUPERVISOR PROGRAMS "CALL EXCEED DURATION VALUE"

↓

402 — STORE "CALL EXCEED DURATION VALUE"

↓

STOP

SYSTEM AND METHOD FOR AUTOMATIC MONITORING OF ACTIVE TELEPHONE CALLS IN A TELEPHONIC SWITCH

BACKGROUND OF THE INVENTION

The present invention is related generally to a telephonic switch for routing incoming telephone calls to a plurality of agents and, more particularly, to a system and method for substantially automatically monitoring incoming telephone calls by a supervisor, or other personnel, in a telephonic switch, such as an automatic call distributor, wherein incoming telephone calls are automatically sequentially monitored by the supervisor based on the length of time of each of the incoming telephone calls.

Automatic call distribution (ACD) systems are increasingly being used by businesses to automatically route incoming customer calls to available agents. ACD systems generally include a multiport switch controlled by a central processing unit to interconnect external telephonic units of an external telephonic network with internal telephonic units. An example of such an ACD system is disclosed in U.S. Pat. No. 5,140,611 issued to Jones et al. on Aug. 18, 1992, entitled "Pulse Modulated Self-Clocking and Self-Synchronizing Data Transmission and Method for a Telephonic Communication Switching System", the disclosure of which is hereby incorporated by reference.

ACD systems provide for acquiring, processing and reporting information concerning different aspects of activity within the system. Typically, this information is presented in printed reports and/or displayed on a data display terminal. Based on this information, management and supervisory personnel are able to evaluate the call activity within the automatic call distributor and, if necessary, make changes for more efficient ACD system operation.

Unfortunately, very little information relating to the actual conversation between an agent and a caller is reported by the prior ACD systems. Supervisors typically must listen in to an incoming telephone call to monitor an agent's telephone manners and the like. Until a complaint is received by a caller about a particular agent, the supervisor may spend a significant amount of time monitoring agents who are quite proficient at handling callers. Such a review process may result in the supervisor unnecessarily wasting time listening to the proficient agents.

Of course, a particular agent may be monitored after receiving a complaint from a caller. However, this is very inefficient since some, and possibly most, callers will not call to complain about an agent. They may simply be irritated and, in the worst case, be reluctant to again call the company. This is obviously unacceptable to companies which depend upon telephone customers, such as telemarketing firms.

The length of an incoming telephone call is one indication of when a call needs to be monitored. A telephone call which is exceedingly lengthy likely indicates that the call in not being handled in an efficient and prompt manner. Thus, supervisors frequently would like to monitor incoming telephone calls which last beyond a predetermined length of time. Supervisors are unfortunately unable to easily monitor such calls in prior systems. Prior systems require that a supervisor manually select which calls are to be monitored. Further, such prior systems do not indicate to the supervisor the length of currently active calls.

Accordingly, there is a need in the art for a system and method for monitoring incoming telephone calls in a telephonic switch wherein the length of time of each currently active incoming telephone call is measured, the active calls are organized in order of decreasing time and a supervisor substantially automatically monitors the active calls in order of decreasing time.

SUMMARY OF THE INVENTION

This need is met by the monitoring system and method of the present invention wherein the length of each incoming telephone call is detected and the incoming telephone calls are monitored based on the length of each of the calls. In particular, active calls are timed, are arranged by decreasing length of time and are substantially automatically monitored in order or decreasing length of time. To further define the calls to be monitored, only calls which exceed a selected call exceed duration value are monitored.

In accordance with one aspect of the present invention, a monitoring system for substantially automatically monitoring active incoming telephone calls routed by a telephonic switch to agents is provided. The system comprises a timing circuit for timing lengths of each of the active incoming telephone calls. A monitor circuit substantially automatically monitors at least one of the active incoming telephone calls based on the timed lengths of the active incoming telephone calls. Preferably, an organizing circuit organizes the active incoming telephone calls in order of decreasing length. The monitor circuit then monitors an active incoming telephone call having the greatest length.

The monitoring system may further comprise an input device for generating a next call signal and wherein the monitor circuit sequentially monitors each of the active incoming telephone calls in response to the next call signal.

In accordance with another aspect of the present invention, a method for monitoring active incoming telephone calls routed by a telephonic switch to agents is provided. The method comprising the steps of: timing lengths of the active incoming telephone calls; and substantially automatically monitoring the active incoming telephone calls based on the timed lengths of the active incoming telephone calls. Preferably, the method may comprise the step of organizing the active incoming telephone calls in order of decreasing length of time. In which case, the step of substantially automatically monitoring comprises the step of sequentially monitoring the active incoming telephone calls in sequential order of decreasing length of time.

It is thus a feature of the present invention to provide a monitoring system and method which substantially automatically monitors active incoming telephone calls to a telephonic switch based on the length of the calls.

It is further a feature of the present invention to provide a monitoring system and method wherein only calls which exceed or equal a definable call exceed duration value are monitored.

These and other features and advantages of the present invention will become apparent from the following detailed description, the accompanying drawings and the appended claims.

BRIEF DESCRIPTION OF THE DRAWINGS

FIG. 3 is an exemplary table used to organize active calls routed by the automatic call distributor shown in FIG. 1;

FIG. 4 is an exemplary flow chart illustrating the selection of a call exceed duration value which is used to generate the table in FIG. 3 by the automatic call distributor shown in FIG. 1.

DETAILED DESCRIPTION OF THE INVENTION

Figure 1:
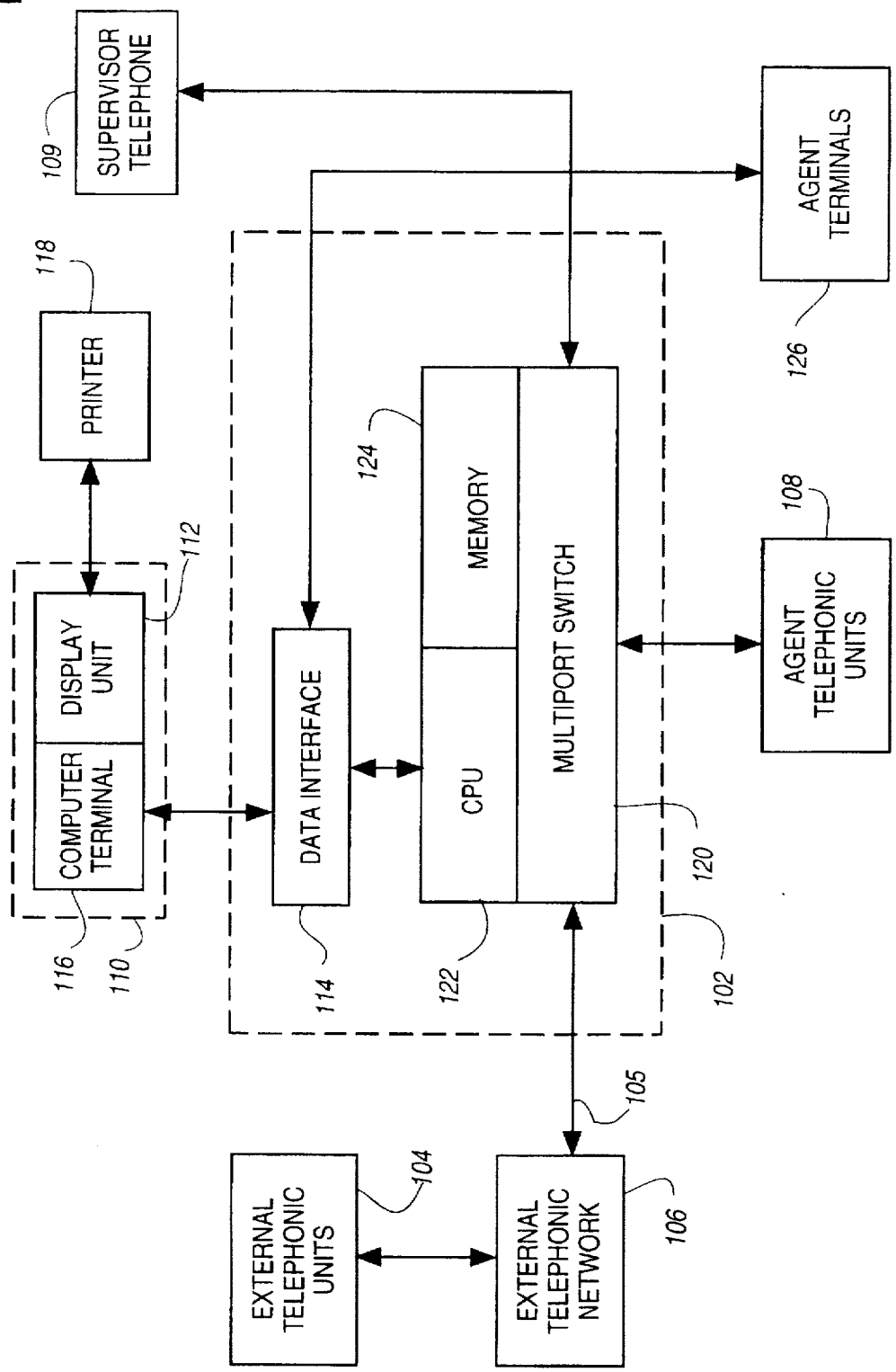
FIG. 1 is a schematic block diagram showing an automatic call distributor for routing incoming telephone calls from external telephonic units and to agent telephonic units.
Figure 2:
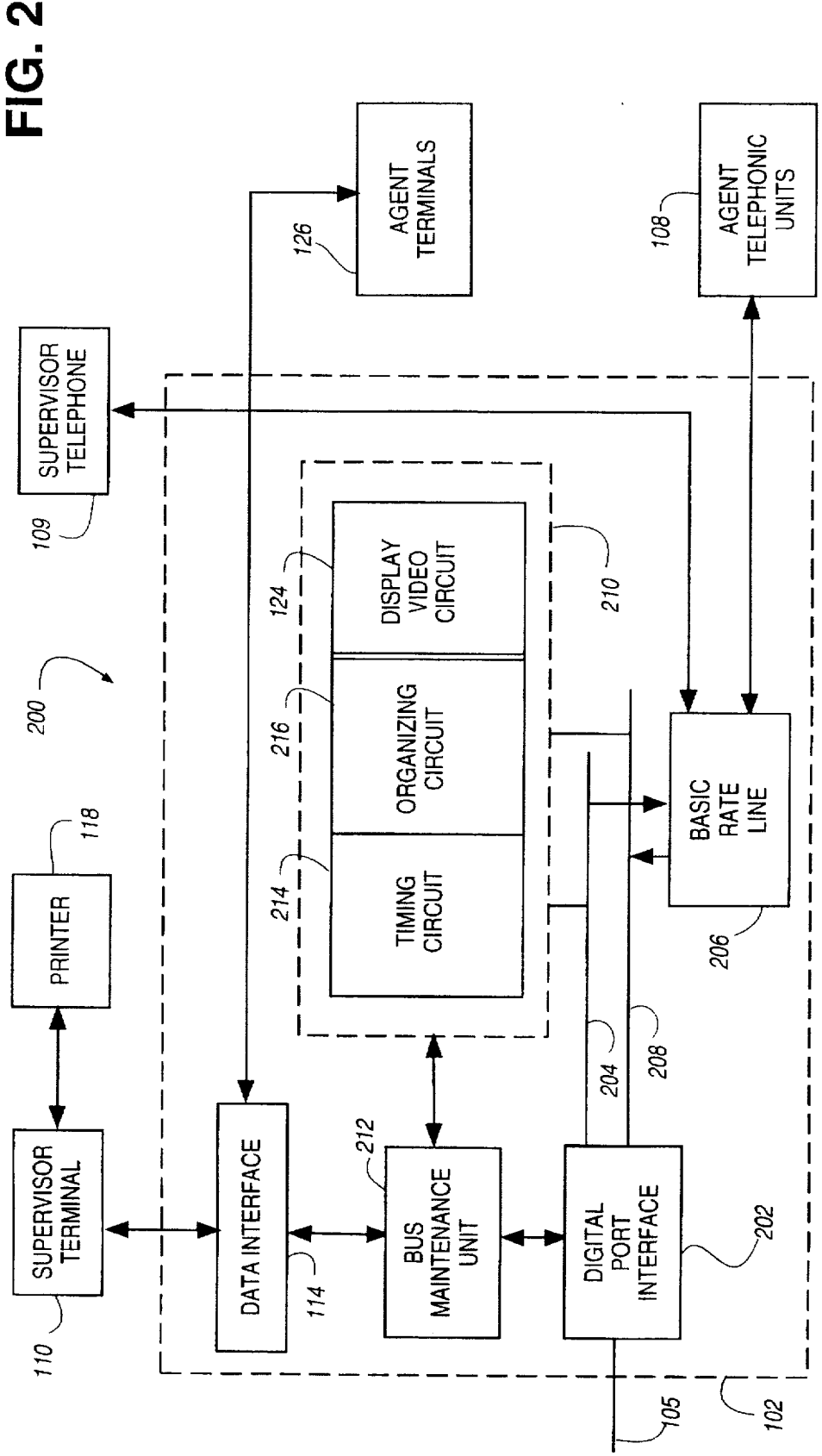
FIG. 2 is a schematic block diagram of the automatic call distributor shown in FIG. 1.

A monitoring system for substantially automatically monitoring active incoming telephone calls being routed through a telephonic switch, preferably an automatic call distributor (ACD) 102, in accordance with the present invention is shown generally in FIG. 1 and in more detail in FIG. 2. The ACD 102 routes incoming telephone calls received from external telephonic units 104 via a telephonic line 105 and an external telephonic network 106 to a plurality of agent telephonic units 108. Incoming telephone calls are monitored by supervisors or other managerial personnel through one or more supervisor telephones 109. As will be readily apparent to those skilled in the art, the telephonic switch, shown as the ACD 102, may be any of a number of different call switching systems, or devices.

The ACD 102 is connected to a supervisor terminal 110 which preferably includes a data display unit 112 for displaying information relating to the operation of the ACD 102 and an input device for communicating instructions via a data interface 114 to the ACD 102. As those skilled in the art will readily comprehend, the input device may be a computer terminal 116 or a telephone. The supervisor terminal 110 is preferably connected to a printer 118 for generating printed records of information relating to the operation of the ACD 102. The ACD 102 has a multiport switch 120 for routing incoming telephone calls to selected ones of the agent telephonic units 108. The multiport switch 120 is controlled by a central processing unit (CPU) 122, or other suitable computer circuit, having an associated memory 124. The CPU 122 is appropriately programmed to route incoming telephone calls through the ACD 102.

Agent terminals 126, which may include conventional display units, display information relating to the operation of the ACD 102 to the agents receiving the incoming telephone calls. The data interface 114 provides communications between the CPU 122, the supervisor terminal 110 and the agent terminals 126. As will be readily apparent, the structure and philosophy of the above components of the ACD 102 are well known in the art and will not be further discussed herein. Further, other configurations of the ACD 102 can be advantageously employed in the present invention. For example, the agent terminals 126 may be an integral part of the agent telephonic units 108, such as digital displays on a telephone or telephonic console.

A schematic diagram of a monitoring system 200 for substantially automatically monitoring incoming telephone calls in accordance with the present invention is shown in FIG. 2. A digital port interface 202 interfaces the ACD 102 with the external telephonic network 106. A first bus 204 transmits callers' voices from the digital port interface 202 to a basic rate line interface 206 for transmission to the agent telephonic units 108. For clarity and ease of description only one agent telephonic unit 108 is shown in FIG. 2. However, it should be understood that the ACD 102 is preferably connected to a plurality of agent telephonic units 108 and agent terminals 126 and one of the units 108 is selected to receive any one incoming telephone call. A second bus 208 transmits agents' voices from the basic rate line interface 206 to the digital port interface 202 for transmission to the external telephonic units 104 to establish voice communications between the agents and the callers.

A digital signal processor 210 analyzes the caller and agent voices on the respective first and second busses 204 and 208. The digital signal processor 210 preferably comprises one or more data analyzing circuits which are programmable. The structure and philosophy of a preferred digital signal processor is disclosed in commonly assigned U.S. Pat. No. 5,434,981, entitled "A Functionally Programmable PCM Data Analyzer and Transmitter for Use in Telecommunications Equipment" to Lenihan et al., and having an issue date of Jul. 18, 1995, the disclosure of which is hereby incorporated by reference. A bus maintenance unit 212 controls the data transmitted from and to the data interface 114 and monitors the operation of the digital port interface 202 to detect the beginning and the end of an incoming telephone call.

For purposes of the present invention, the monitoring system 200 comprises a timing circuit 214 for timing lengths of telephone calls routed through the ACD 102. The bus maintenance unit 212 sends a signal when an incoming telephone call is commenced, or has become active, and sends another signal when an active incoming telephone call has ended to the timing circuit 214. The timing circuit 214 monitors the duration of each of the active telephone calls and provides the length of the active calls to a monitor circuit.

The monitor circuit is comprised of an organizing circuit 216 and a display video circuit 218. The organizing circuit 216 receives the lengths of the active calls from the timing circuit 214 and organizes the calls in order of decreasing lengths, as shown in an exemplary table 300 in FIG. 3. The first active incoming telephone call 1120 has a current length of 25 minutes and 37 seconds. The length of the call is increasing every second that the call is active. The second active incoming telephone call 1160 has a current length of 20 minutes and 15 seconds. The third active incoming telephone call 1060 has a current length of 15 minutes and 6 seconds and the fourth active incoming telephone call has a current length of 10 minutes and 12 seconds. Upon notification from the bus maintenance unit 212 that a call has been completed, the organizing circuit 216 removes the completed call from the table 300. Each active incoming telephone call preferably has an associated call code which identifies the particular call. Any number of well known methods may be implemented for associating the call code with an active incoming telephone call. For example, the trunk number over which the active incoming telephone call was transmitted to the ACD 102 or a call sequence number assigned by the CPU 122 may be employed as a call code. The monitor circuit of the present invention then connects a supervisor, or other personnel, via the supervisor telephone 109 to each of the active incoming telephone calls in order of decreasing length of time.

The organizing circuit 216 matches the call codes for each active incoming telephone call with an unique identification code which uniquely identifies the agent handling the active incoming telephone call. As is well known, agents are assigned unique identification codes so that the ACD 102 is able to uniquely identify each agent. The display video circuit 218 transmits the appropriate identification code to the supervisor terminal 110 for display to the supervisor while the supervisor monitors an active incoming telephone call. The display video circuit 218, the bus maintenance unit 212, the data interface 114 and the supervisor terminal 110 comprise a display circuit for displaying the unique identification code of the agent handling the active incoming telephone call which is being monitored.

Figure 5:
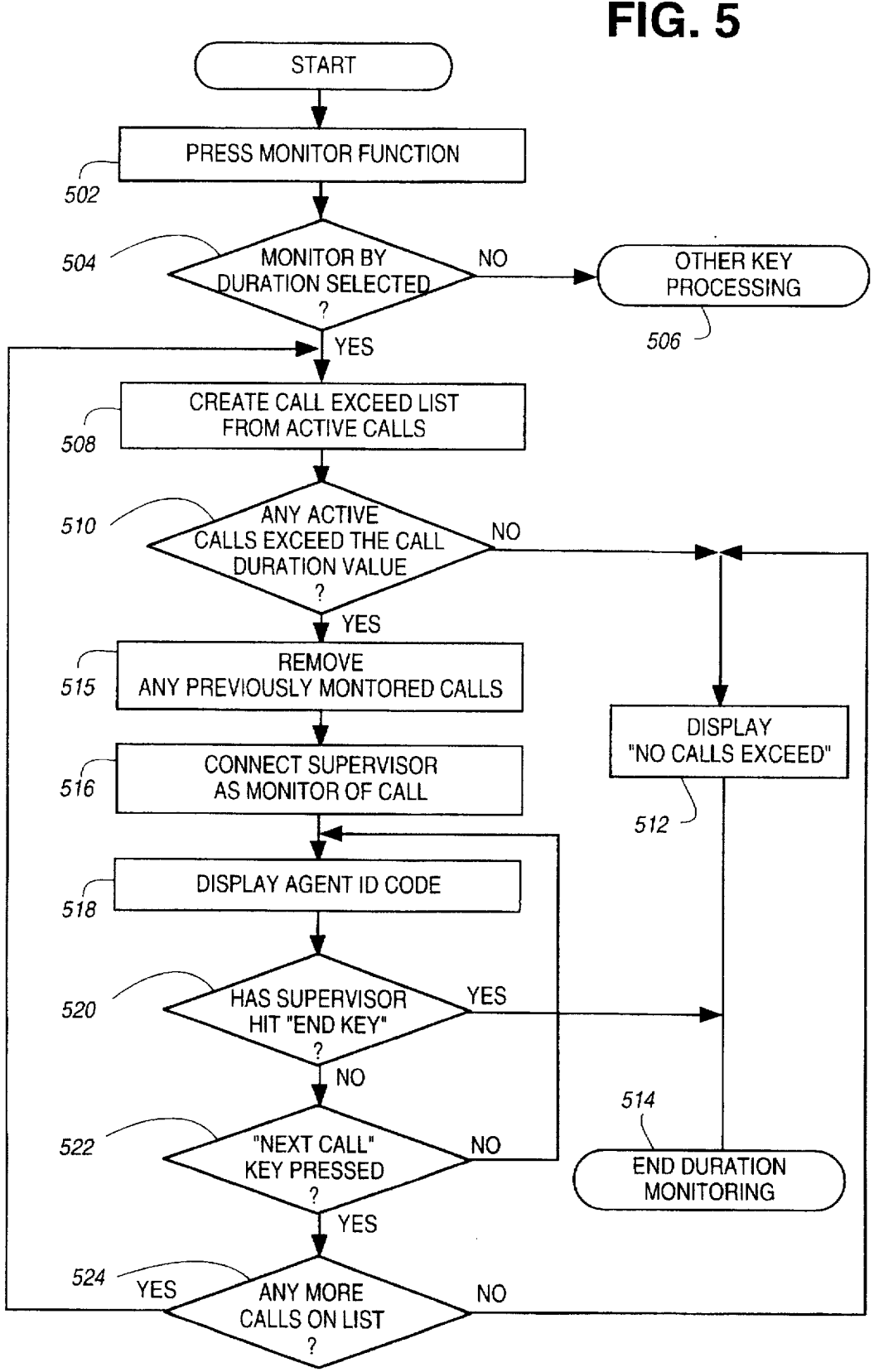
FIG. 5 is a flow chart illustrating steps for automatically monitoring incoming telephone calls routing through the automatic call distributor shown in FIG. 1 in accordance with one aspect of the present invention.

FIGS. 4 and 5 show flow charts illustrating the manner in which the present invention is implemented. A supervisor sets a call exceed duration value, at step 400, through an input device, such as the supervisor terminal 110. Preferably, only the active incoming telephone calls equal to or exceeding the call exceed duration value will be monitored. The organizing circuit 216 may omit from the table 300 any active incoming telephone calls which do not exceed the call exceed duration value. The call exceed duration value is next stored, at step 402, in one of the electronic storage devices in the ACD 102, such as the CPU 122.

The monitoring system 200 is activated by the supervisor pressing a monitor function at step 502. The monitor function is selected through the supervisor terminal 110. The monitor function will typically include manual monitoring wherein the supervisor manually selects which agent and/or telephone call to monitor or the automatic monitoring, or monitoring by duration, of the present invention. It is thus next determined whether the supervisor selected the monitor by duration selection at step 504. If the monitor by duration is not selected, other key procedures are performed at step 506.

If the monitor by duration is selected, the organizing circuit, at step 508, creates a call exceed list from currently active calls, such as the table 300. At step 510, it is determined whether there are any active incoming telephone calls which have a length exceeding or equaling the call exceed duration value. If not, the display video circuit 218 prompts the display unit 112 of the supervisor terminal 110 to display the "No Calls Exceed" message at step 512 and the automatic duration monitoring ends at step 514.

If there are available incoming telephone calls which have a length which exceed the call exceed duration value, the calls which have previously been monitored are removed from the list at step 515. The supervisor is then connected to the active incoming telephone call in the call exceed list having the longest length at step 516. Substantially simultaneously, the agent identification code of the agent handling the call being monitored is displayed on the display unit 112 at step 518. The supervisor then monitors the call until an "end" key is activated at step 520 or until an "next call" key is activated at step 522. As skilled in the art will readily comprehend, the "next" and the "end" keys may be any number of programmed keystrokes.

If the supervisor activates the "end" key, the duration monitoring ends at step 514. If the supervisor activates the "next call" key, it is determined whether any more calls are included in the call exceed list at step 524. If there are calls remaining on the call exceed list, the flow chart returns to step 508. If no calls are remaining on the call exceed list the "No Calls Exceed" message is displayed at step 512 and the duration monitoring ends at step 514.

In accordance with the present invention, a method for monitoring active incoming telephone calls routed by a telephonic switch, such as ACD 102, to agents is provided. The method comprises the steps of timing lengths of the active incoming telephone calls and substantially automatically monitoring the active incoming telephone calls based on the timed lengths of the active incoming telephone calls. The active incoming telephone calls may be organized in order of decreasing length of time. The active incoming telephone calls are then sequentially monitored in sequential order of decreasing length of time.

The supervisor monitors the next call on the call exceed list by generating a next call signal via the supervisor terminal 110. The monitoring system then monitors the active incoming telephone call which is next in sequence in response to the next call signal. The method may include the steps of selecting a call exceed duration value; comparing the call exceed duration value to the timed lengths of the active incoming telephone calls; and monitoring the active incoming telephone calls which are not less than the call exceed duration value. The active incoming telephone calls which are not less than the call exceed duration value are organized in sequential order of decreasing length of time. The active incoming telephone calls which are not less than the call exceed duration value are monitored in sequential order of decreasing length of time.

Preferably, an unique identification code is assigned to each of the agents. The unique identification code of the one of the agents handling the active incoming telephone call being monitored is displayed to the supervisor. Indicating the appropriate identification code may comprise the step of displaying the unique identification code on a display concomitant with monitoring one of the active incoming telephone calls.

Having thus described the invention in detail by way of reference to preferred embodiments thereof, it will be apparent that other modifications and variations are possible without departing from the scope of the invention defined in the appended claims. For example, the telephonic switch may have design configurations which depart from those described herein with reference to the ACD 102. Therefore, the spirit and scope of the appended claims should not be limited to the description of the preferred versions contained herein.

What is claimed is:

1. A monitoring system for substantially automatically monitoring active incoming telephone calls routed by a telephonic switch to agents, the system comprising:

a timing circuit for measuring a length of time associated with each of the active incoming telephone calls;

a monitoring circuit for substantially automatically monitoring at least one of the active incoming telephone calls based on the measured length of time of the active incoming calls;

an organizing circuit configured to arrange the active incoming telephone calls according to at least one of a measured increasing length of time and a measured decreasing length of time;

the monitoring circuit configured to monitor an active incoming telephone call having a second greatest length when the active incoming telephone call having the greatest length is completed; and reporting means for providing an identification of agents, the telephone calls of which have a measured length of time exceeding a predetermined value.

2. The monitoring system as recited in claim 1 further including an input device for generating a next call signal and wherein, the monitoring circuit sequentially monitors each of the active incoming telephone calls in response to the next call signal.

3. The monitoring system as recited in claim 1 further including an input device for establishing a call exceed duration value; and wherein the monitoring circuit compares the call exceed duration value to the measured length of time of the active incoming telephone calls and monitors active incoming telephone calls having a length of time not less than the call exceed duration value.

4. The monitoring system as recited in claim 3 wherein the input device is a computer terminal.

5. The monitoring system as recited in claim 3 wherein the input device is a telephone.

6. The monitoring system as recited in claim 1 wherein each of the agents is assigned an unique identification code and the monitoring circuit further includes a display circuit for displaying the unique identification code of one of the agents handling the at least one of the active incoming telephone calls begin monitored.

7. A method for monitoring active incoming telephone calls routed by a telephonic switch to agents, the method comprising the steps of:

measuring a length of time associated with the active incoming telephone calls;

substantially automatically monitoring the active incoming telephone calls in sequential order of decreasing length of time;

organizing the active incoming telephone calls in order of decreasing length of time; and providing an identification of agents, the telephone calls of which have a measured length of time exceeding a predetermined value.

8. The method as recited in claim 7 further including the step of generating a next call signal; and wherein the step of sequentially monitoring includes the step of monitoring an active incoming telephone call which is next in sequence in response to the next call signal.

9. The method as recited in claim 7 wherein the step of substantially automatically monitoring includes the steps of selecting a call exceed duration value;

comparing the call exceed duration value to the length of time of the active incoming telephone calls; and monitoring the active incoming telephone calls which are not less than the call exceed duration value.

10. The method as recited in claim 9 wherein the step of substantially automatically monitoring comprises the steps of:

organizing the active incoming telephone calls which are not less than the call exceed duration value in sequential order of decreasing length of time; and monitoring the active incoming telephone calls which are not less than the call exceed duration value in sequential order of decreasing length of time.

11. The method recited in claim 7 comprising the steps of:

assigning an unique identification code to each of the agents; and indicating the unique identification code of one of the agents handling the active incoming telephone call being monitored.

12. The method as recited in claim 7 wherein the step of indicating the unique identification code comprises the step of:

displaying the unique identification code on a display concomitant with monitoring one of the active incoming telephone calls.

13. A monitoring system for substantially automatically monitoring active incoming telephone calls routed by a telephonic switch to a plurality of agents, each of the agents being assigned a unique identification code, the system comprising:

a timing circuit for timing lengths of each of the active incoming telephone calls;

an input device for establishing a call exceed duration value; and a monitor circuit for comparing the timed lengths of each of the active incoming telephone calls to the call exceed duration value, for substantially automatically monitoring at least one of the active incoming telephone calls having timed lengths not less than the call exceed duration value and for indicating the unique identification code for each of the agents handling the at least one of the active incoming telephone calls being monitored;

the monitor circuit further including an organizing circuit for organizing the active incoming telephone calls in order of decreasing length; and wherein the monitor circuit sequentially monitors active incoming telephone calls in order of decreasing length, whereby an active incoming telephone call having the longest length is initially monitored.

14. The monitoring system as recited in claim 13 wherein the monitor circuit automatically monitors an active incoming telephone call having a second longest length when the active incoming telephone call having the longest length is completed.

15. The monitoring system as recited in claim 12 comprising:

an input device for generating a next call signal and wherein, the monitor circuit sequentially monitors each of the active incoming telephone calls in response to the next call signal.

16. The monitoring system as recited in claim 15 wherein the input device is a computer terminal.

* * * * *